United States Patent [19]

Scofield

[11] Patent Number: 4,897,811
[45] Date of Patent: Jan. 30, 1990

[54] N-DIMENSIONAL COULOMB NEURAL NETWORK WHICH PROVIDES FOR CUMULATIVE LEARNING OF INTERNAL REPRESENTATIONS

[75] Inventor: Christopher L. Scofield, Barrington, R.I.

[73] Assignee: Nestor, Inc., Providence, R.I.

[21] Appl. No.: 145,630

[22] Filed: Jan. 19, 1988

[51] Int. Cl.[4] ............................................. G06F 15/18
[52] U.S. Cl. .................................... 364/900; 364/916; 364/916.2; 364/513
[58] Field of Search ................. 364/200, 300, 900, 513

[56] References Cited

U.S. PATENT DOCUMENTS 4,752,906  6/1988  Kleinfeld ...................... 364/300 X
4,796,199  1/1989  Hammerstrom et al. ............ 364/513

OTHER PUBLICATIONS

A Relaxation Model for Memory with High Storage Density by Charles M. Bachmann et al.-Neural Networks, pp. 1-9.

*Primary Examiner*—Raulfe B. Zache
*Attorney, Agent, or Firm*—Karl F. Milde, Jr.

[57] ABSTRACT

A learning algorithm for the N-dimensional Coulomb network is disclosed which is applicable to multi-layer networks. The central concept is to define a potential energy of a collection of memory sites. Then each memory site is an attractor of other memory sites. With the proper definition of attractive and repulsive potentials between various memory sites, it is possible to minimize the energy of the collection of memories. By this method, internal representations may be "built-up" one layer at a time. Following the method of Bachmann et al. a system is considered in which memories of events have already been recorded in a layer of cells. A method is found for the consolidation of the number of memories required to correctly represent the pattern environment. This method is shown to be applicable to a supervised or unsupervised learning paradigm in which pairs of input and output patterns are presented sequentially to the network. The resulting learning procedure develops internal representations in an incremental or cumulative fashion, from the layer closest to the input, to the output layer.

3 Claims, 4 Drawing Sheets

N-DIMENSIONAL COULOMB NEURAL NETWORK WHICH PROVIDES FOR CUMULATIVE LEARNING OF INTERNAL REPRESENTATIONS

BACKGROUND OF THE INVENTION

General learning algorithms for multi-layer neural networks have only recently been studied in detail. Recent work in this area began with the multi-layer Boltzmann machines. Hinton, G. E., and Sejnowski: "Optimal Perceptual Inference," *Proceedings of the IEEE Conference on Computer Vision Pattern Recognition*, 448-453 (1983), and Hinton, G. E., Sejnowski, T. J., Ackley, D. H.: "Boltzmann Machines: Constraint Satifaction Networks that Learn", *Tech. Report* CMU-CS-84-119, Carnegie-Mellon University (May 1984). Hinton and Sejnowski found that a learning algorithm for multi-layer networks could be described for their system. However, the low rate of convergence of the synaptic state of this system led them, and others to look for alternative multi-layer learning systems. Rumelhart, Hinton and Williams found that a generalization of the delta rule could describe learning in multi-layer feedforward networks. Rumelhart, D. E., Hinton, G. E., and Williams, R. J.: "Learning Representations by Back Propagating Errors", *Nature*, 323, 533-536 (1986). This delta rule was independently developed by Parker. Parker, D. B.: "Learning-logic (TR-47)," Massachusetts Institute of Technology, Center for Computational Research in Economics and Management Science, (1985). This system, now often called "Back Propagation", is much faster than the Boltzmann machine and is able to automatically acquire internal synaptic states which seem to solve many of the classic toy problems first posed by Minsky and Papert. Minsky, M. and Papert, S.: *Perceptrons*, MIT Press (1969). These complex internal states have been called "internal representations" of the pattern environment. Rumelhart, D. E., Hinton, G. E., and Williams, R. J.: "Learning Internal Representations by Error Propagation," in D. E. Rumelhart and J. L. McClelland (Eds.) *Parallel Distributed Processing*, MIT Press, 318-364 (1986). However, it has been found that the convergence rate of the synaptic state of this system goes much slower than linearly with the number of layers in the network. Ballard, D. H.: "Modular Learning in Neural Networks," *Proceedings of the Sixth National Conference on Artificial Intelligence*, 1, 279-284 (1987). This property has been called the "scaling problem" since it appears to be a significant limitation on the scaling of such networks to large, real-world, problems. Hinton, G. E., and Sejnowski: "Neural Network Architectures for AI," *Sixth National Conference on Artificial Intelligence*, Tutorial Program MP-2(1987). In the aforementioned article on "Modular Learning", Ballard proposed a method for handling the scaling problem by stacking auto-associating units one on the other. This method violates the feedforward architecture, but the system does appear to reduce the multi-layer learning time.

The Boltzmann machine was an extension of the work of Hopfield who had been studying single layer recurrent networks. Hopfield, J. J.: "Neural Networks and Physical Systems with Emergent Collective Computational Abilities," *Proc. Natl. Acad. Sci. U.S.A.* 79, 2554-2558 (April 1982), and Hopfield, J. J.: "Neurons with Graded Response Have Collective Computational Properties Like Those of Two-State Neurons," *Proc. Natl. Acad. Sci. U.S.A.* 81, 2088-3092 (May 1984). Hopfield introduced a method for the analysis of settling of activity in recurrent networks. This method defined the network as a dynamical system for which a global function called the "energy" (really a Liapunov function for the autonomous system describing the state of the network) could be defined. This energy then contained fixed points in the system state space. Hopfield showed that flow in state space is always toward the fixed points of the dynamical system if the matrix of recurrent connections satisfies certain conditions. With this property, Hopfield was able to define the fixed points as the sites of memories of network activity.

Like its forerunners, the Hopfield network suffered from limitations in storage capacity. The degradation of memory recall with increased storage density is directly related to the presence in the state space of unwanted local minima which serve as basins of flow.

Bachmann, Cooper, Dembo and Zeitouni have studied a system not unlike the Hopfield network; however, they have focused on defining a dynamical system in which the locations of the minima are explicitly known, and for which it is possible to demonstrate that there are no unwanted local minima. Bachmann, C. M., Cooper, L. N., Dembo, A., Zeitouni, O.: "A Relaxation Model for Memory with High Density Storage," *Proc. Natl. Acad. Sci. U.S.A.*, Vol. 84, No. 21, pp. 7529-7531 (1987). In particular, they have chosen a system with a Liapunov function given by $$\xi = -1/L \sum_{j=1}^{m} Q_j |\overline{\mu} - \overline{x}_j| - L, \quad (1)$$

where $\mu$ is the N-dimensional state vector and $\overline{X}_j$ is the jth memory in the N-dimensional state space. This N-dimensional Coulomb energy function defines exactly m basins of attraction to the fixed points located at the charge (memory) sites $x_j$. It can be shown that convergence to the closest distinct memory is guaranteed, independent of the number of stored memories m, for proper choise of N and L. Dembo, A., Zeitouni, O.: "ARO Technical Report," Brown University, Center for Neural Science, Providence, R.I. Bachmann et al. have employed a network implementation of this system which is strictly local however, and does not have some of the desirable characteristics of the distributed Hopfield representations.

SUMMARY OF THE INVENTION

The present invention provides a learning algorithm for the N-dimensional Coulomb network which is applicable to single and multi-layer networks and develops distributed representations. The central concept is to define a potential energy of a collection of memory sites. Then each memory site is an attractor of not only test patterns, but other memory sites as well. With proper definition of attractive and repulsive potentials between the memory sites, it is possible to minimize the energy of the collection of memories. With this method, the training time of multi-layer networks is a linear function of the number of layers.

A method for the consolidation of the representation of memories of events that have already been recorded in a layer of cells is first considered. It is shown that this method is applicable to a supervised learning paradigm in which pairs of input and output (or classification) patterns are presented sequentially to the network. It is then shown how the resulting learning procedure develops internal representations incrementally from the layer closest to the input, to the output layer.

For a full understanding of the present invention, reference should now be made to the following detailed description of the preferred embodiments of the invention and to the accompanying drawings.

BRIEF DESCRIPTION OF THE DRAWINGS

FIG. 6, comprised of FIGS. 6a, 6b and 6c, depicts the individual mappings from layer 1 to layer 3 in the neural network of FIG. 5. In this case, each of the two non-linear mappings $\omega^1(D^1)$ and $\omega^2(D^2)$ were learned separately.

DESCRIPTION OF THE PREFERRED EMBODIMENTS

Learning In The N-Dimensional Coulomb Network:

Consider a system of m memory sites $\bar{x}_1, \ldots, \bar{X}_m$ in the network response space $R^N$. Let memory sites associated with a particular class, C, be $x_i(c)$. Then, employing the energy of Bachmann et al., $$\xi = -1/L \sum_j Q_j |\bar{\mu} - \bar{x}_j| - L \quad (2)$$

in the absence of the test charge $\mu$, the electrostatic potential energy of the configuration of memory sites is:

$$\psi = 1/(2L) \sum_i \sum_j Q_i Q_j |\bar{x}_i - x_j| - L \quad (3)$$

First we define an attractive potential energy between memory sites of the same class, and a repulsive potential energy between memory sites of different class. Then we define the $Q_i$ such that:

$$\text{sign}(Q_i(c)) \neq \text{sign}(Q_j(c')) \text{ for } c = c', \quad (4)$$

$$\text{sign}(Q_i(c)) = \text{sign}(Q_j(c')) \text{ for } c \neq c'.$$

In this case $\Psi$ describes the electrostatic potential energy of a collection of charges of like and different sign, located at the sites $\bar{x}_1, \ldots, \bar{x}_m$ in $R^N$.

Then we may relax the constraint that the m memory sites are fixed in $R^N$, by allowing the charges to evolve according to the laws of electrodynamics. Intuitively, the memory sites of same class (but pairwise different charge sign) will be attracted to each other, and memory sites of different class (and same charge sign) will be repelled from each other. We make the definition $$\bar{x}_i = \sum_n \hat{e}_n \sum_m \omega_{nm} f_{mi}.$$

where $\hat{e}_n$ is the unit vector identifying the $n^{th}$ cell, $\omega_{nm}$ is the matrix of afferent synapses to the layer of cells with activity $\mu$, and $f_{mi}$ is the afferent activity copied as memory $x_i$. For simplicity we make a notational change:

$$\bar{R}_{ij} = \bar{x}_i - \bar{x}_j. \quad (6)$$

Then $$\bar{R}_{ij} = \sum_n \sum_m \hat{e}_n \omega_{nm}(f_{mi} - f_{mj}). \quad (7)$$

or:

$$\psi = 1/(2L) \sum_i \sum_j Q_i Q_j \left| \sum_n \sum_m \hat{e}_n \omega_{nm}(f_{mi} - f_{mj}) \right| - L. \quad (8)$$

Now, motion of the memory sites in the activity space of the layer of cells occurs as a result of changes in the afferent matrix of synapses to the cell layer, $\omega$. We would like to know how to adjust the matrix $\omega$ such that the electrostatic energy, $\Psi$, of the collection of charges (corresponding to the memory sites) is minimized. Thus, in the usual manner we compute the gradient of the potential energy with respect to the weights $\omega_{nm}$:

$$\delta \omega_{nm} = -\partial \psi / \partial \omega_{nm} = \quad (9)$$

$$1/(2L) \sum_i \sum_j Q_i Q_j \left| \sum_n \sum_m \hat{e}_n \omega_{nm}(f_{mi} - f_{mj}) \right| - (L + 1) \times$$

$$\partial/\partial \omega_{nm} \left| \sum_n \sum_m \hat{e}_n \omega_{nm}(f_{mi} - f_{mj}) \right|.$$

Now:

$$\partial/\partial \omega_{nm} |\bar{R}_{ij}| = [\bar{R}_{ij}/|\bar{R}_{ij}|] \partial/\partial \omega_{nm} \sum_q \sum_p \hat{e}_q \omega_{qp}(f_{pi} - f_{pj}) =$$

$$[\bar{R}_{ij}/|\bar{R}_{ij}|] \delta_{n,q} \delta_{m,p} \hat{e}_q(f_{pi} - f_{pj}).$$

or:

$$\delta \omega_{nm} = 1/2 \sum_i \sum_j Q_i Q_j |\bar{R}_{ij}| - (L + 2) \bar{R}_{ij} \cdot \hat{e}_n(f_{mi} - f_{mj}). \quad (10)$$

Thus, for the nth cell in the network, the afferent vector of weights, $\bar{\omega}_n = [\omega_{1n}, \ldots \omega_{1K}]$, must evolve according to:

$$\delta \omega = 1/2 \sum_i \sum_j Q_i Q_j |\bar{R}_{ij}| - (L + 2)(\bar{x}_i - \bar{x}_j) \times (\bar{f}_i - \bar{f}_j). \quad (11)$$

Relaxation of memory sites according to equation (11) will allow consolidation of memory sites of same class, and separation of memory sites of different class through the minimization of $\Psi$. That is, the mapping $\underset{\sim}{\omega}$ evolves in such a way as to collapse the representation of a class in $R^N$ while enhancing class distinctions.

Note, however, that with a linear dependence of each cell activity on the inner product of a cell weight vector, a multilayer network will not achieve further consolidation than a single layer. Following the method of Rumelhart et. al. disclosed in Rumelhart, D. E., Hinton, G. E., and Williams, R. J.: "Learning Representations by Back Propagating Errors", *Nature*, 323, 533–536 (1986), we employ the sigmoid function F to represent cell activity:

$$F\left(\sum_m \omega_{nm} f_{mi}\right) = (1 + e^{-(1/kT)(\sum_m \omega_{nm} f_{mi} + \theta)})^{-1} \quad (12)$$

Then:

$$\bar{x}_i = \sum_n \hat{e}_n F_n\left(\sum_m \omega_{nm} f_{mi}\right)$$

It is easy to show that:

$$\partial/\partial\omega_{nm}\bar{x}_i = \hat{e}_n F_n(1 - F_n) f_{mi},$$

and thus that:

$$R_{ij}\partial/\partial\omega_{nm}\bar{R}_{ij} =$$

$$(F_n(\bar{f}_i) - F_n(\bar{f}_j))(F_n(\bar{f}_i)(1 - F_n(\bar{f}_i))f_{mi} - F_n(\bar{f}_j)(1 - F_n(\bar{f}_j))f_{mj})$$

For brevity we define:

$$R_{ij}\partial/\partial\omega_{nm}R_{ij} \equiv \Delta_{nm}(\bar{f}_i,\bar{f}_j).$$

Then finally, the evolution of the $m^{th}$ synapse of the $n^{th}$ cell follows:

$$\delta\omega_{nm} = 1/2 \sum_i \sum_j Q_i Q_j |\bar{R}_{ij}| - (L + 2)\Delta_{nm}(\bar{f}_i,\bar{f}_j) \quad (13)$$

Evolution of the matrix $\underset{\sim}{\omega}$, according to equation (13) will minimize the electrostatic potential energy of a collection of m charges by allowing charges of opposite sign (same class) to be attracted to each other and charges of same sign (or opposite class) to be repelled from each other. In other words, this is an alogrithm for the generation of a non-linear mapping from an input space, $R^N$, with m distinct memories of M classes, to a space $R^{N'}$, with n (n<m) distinct memories of M classes. That is, the mapping preserves the class structure of the pattern environment, but consolidates the representation of the environment.

Of interest are possible network implementations of equation (13). The algorithm described relies on the pairwise interactions of the memories. For this reason, each node in the network must "remember" the locations of the memories in its activity space so that the differences $\bar{R}_{ij}$ may be computed. This form of implementation is not impossible, however it does require the use of more complex nodes than are usually considered in neural networks. An alternative network implementation of this algorithm can be devised which requires nodes which need only remember their activity levels for the previously presented pattern. This method can be implemented through the use of supervised (or unsupervised) learning.

Supervised Learning:

The algorithm described by equation (13) may be easily extended to systems in which the memories do not already exist. That is, we may view this as an algorithm for learning representations from a pattern environment, D. We employ the standard supervised learning procedure in which patterns from D are presented to the network which produces output vectors or classifications of the input. Training consists of adjusting the synaptic state $\omega$ to give the correct output classifications.

Equations (13) describes a pairwise interaction between memories; a term in the equation contains factors from patterns i and j. We would like to approximate equation (13) through the accumulation, over time, of the $N^2$ terms. Thus, we must define a system which remembers the response of the layer to the last pattern seen, and is able to then compare it to the response to the next pattern seen. That is, suppose that patterns f(t) and f(t+1) appear on the input lines to the layer of cells. The activity pattern in response to a pattern f(t) is then defined as:

$$\bar{x}(t) = \sum_n \hat{e}_n F_n\left(\sum_m \omega_{nm} f_m(t)\right) = \sum_n \hat{e}_n F_n(\bar{f}(t)).$$

Then, as before, we may define a relaxation procedure on $\omega$, but now as a function of the activity caused by patterns in the environment. For subsequent patterns, $$\delta\omega_{nm} = (+/-)|\bar{x}(t) - \bar{x}(t+1)| - (L+2)\Delta_{nm}(\bar{f}(t),\bar{f}(t+1)) \quad (14)$$

where we take the negative sign for subsequent patterns of the same class, and the positive sign for patterns of different class.

Equation (14) is a very simple prescription for the acquisition of a representation $\underset{\sim}{\omega}$: if two patterns are of the same class, then adjust $\underset{\sim}{\omega}$ such that their positions in the response space ($R^N$) move closer to each other, if the two patterns are of different class, adjust $\underset{\sim}{\omega}$ such that the two pattern responses move apart.

To better understand the relationship between equation (14) and the structure of the environment D, we must define D in greater detail. Suppose that the pattern environment consists of m distinct patterns: $D = [\bar{f}_1, \ldots, \bar{f}_m]$. However, suppose that some patterns occur more frequently than others over time; in particular, suppose that pattern $\bar{f}_i$ occurs with a probability $p_i$. Then if we average equation (14) over the full pattern environment:

$$<\delta\omega_{nm}>|_D = (1/2)p_i \sum_j p_j |\bar{R}_{ij}| - (L + 2)\Delta_{nm}(\bar{f}_i,\bar{f}_j). \quad (15)$$

That is, the evolution of the system in response to a pattern $\bar{f}_i$ must be computed through an average over the full set of N patterns. This requires the computation of N terms for each pattern. Then evolution of the system for the full environment requires an average of equation (15) over the environment:

$$<\delta\omega_{nm}>|_D = 1/2 \sum_i \sum_j p_i p_j |\bar{R}_{ij}| - (L + 2)\Delta_{nm}(\bar{f}_i,\bar{f}_j). \quad (16)$$

Comparison of equations (13) and (16) allows us to identify the charge $Q_i$ with the probability $p_i$ of a pattern causing a response at the location $\bar{x}_i$. This identification is intuitively clear: the size of the attractive basin surrounding a memory in the energy defined by equation (1) is a function of the amount of charge at the memory site. Memories of events which are very frequent in D will form larger basins of attraction in $R^N$, and thus be the likely identifiers of new events $\bar{\mu}$.

We may define an energy according to equation (3) for each layer of a multi-layer network. Then the energy of each layer may be minimized according to (13) (or equivalently equation (16)), independent of the other layers in the system. $\delta\underline{\omega}$ does not depend on an error that is propagated through more than one layer. Convergence to an internal representation progresses from the layer closest to the input, to the layer nearest the output. This system constructs an internal representation layer-by-layer.

Network implementation of equation (16) requires that each cell in the network compare the current activity $F_n(\bar{f}_j)$ with the activity of a previously presented pattern $F_n(\bar{f}_i)$, (implicit in the quantity $\Delta_{nm}(\bar{f}_i,\bar{f}_j)$). For pairwise interactions, this requires the computation of $N^2$ terms. Thus, training time for layers nearest to the input will be proportional to the square of the number of patterns in the environment. However, deeper layers in a multi-layer network will train much faster since the number of distinct activity levels will be reduced to the number of distinct classes of events in the environment as one approaches the output layer.

Further, equation (16) requires that each cell have access to the quantity $|\bar{R}_{ij}|$. This factor is a measure of the distance between network states for different patterns. This measure is the same for all cells; it is as if a single virtual cell was computing the distance in activity space between subsequent network states and broadcasting this quantity throughout the network.

Figure 1:
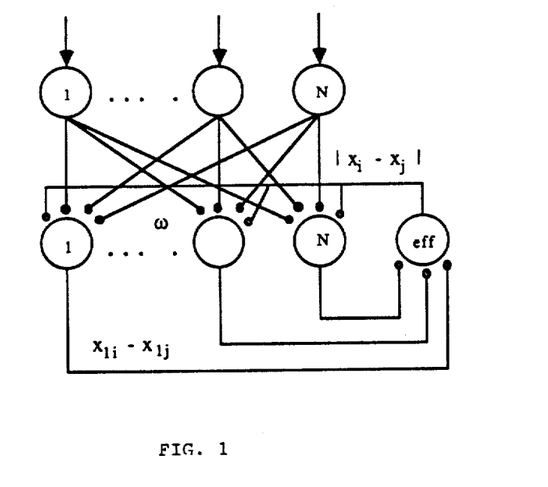
FIG. 1 is a representational diagram of a neural network illustrating a network implementation of the N-dimensional Coulomb energy. Computation of the memory distances is performed by an "effective" cell and broadcast through non-modifiable synapses, which are shown as white circles in the drawing.

Interestingly, this mechanism is related to a mean field theory of the visual cortex, as reported in Scofield, C. L.: "A Mean Field Theory of Layer IV of Visual Cortex and its Application to Artificial Neural Networks.: Presented at the IEEE Conference on "Neural Information Processing Systems—Natural and Synthetic", Denver, Colo. (1987). Recent study by Cooper and Scofield of the target layer of visual input to mammalian cortex has found that a mean field approximation of the detailed cortical activity patterns is sufficient to reproduce the experimentally observed effects of deprivation on visual learning. Recurrent cortical connectivity may be replaced by a single "effective" cell which computes the mean cortical activity and broadcasts the signal to all cells of the network. In a similar fashion, the factor $|\bar{R}_{ij}|$ may be computed by a single effective cell and returned to each cell in the network. This configuration is illustrated in FIG. 1 which shows a two-layer network with a first layer of N cells 10 and a second layer of N cells 12 with an effective cell 14.

Simulation Results:

To see that this system develops a single internal representation incrementally from one layer to the next, we must look in detail at the representations that develop. We begin with some notation. Let the environment of pattern activity afferent to the $i^{th}$ layer of cells be $D^i$. The matrix of synapses to the $i^{th}$ layer of cells $\underline{\omega}^i$ transforms the environment $D^i$ to the activity patterns $D^{i+1}$:

$$D^{i+1} = \underline{\omega}^i(D^i) \tag{17}$$

Figure 2:
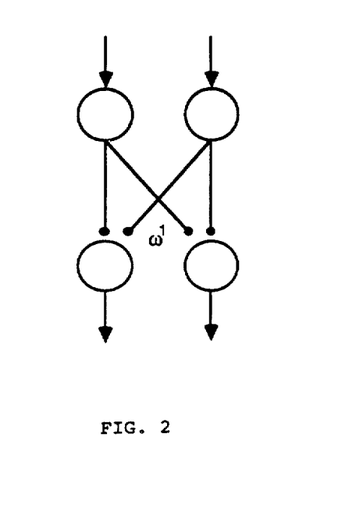
FIG. 2 is a representational diagram of a two-layer neural network for the development of the first mapping $D^2 = \omega^1(D^1)$. Recurrent connectivity is not illustrated.

We consider the XOR problem since this has been studied in detail with the generalized delta rule. We begin with a simple two layer network with two cells 16 and 18, and 20 and 22, respectively, in each layer, as illustrated in FIG. 2, in which the input layer is the source of pattern environment $D^i$, which projects to a second layer of two cells through the matrix $\underline{\omega}^1$. (For clarity, mean field connectivity for the computation of $|\bar{R}_{ij}|$ is not illustrated in FIGS. 2–6.)

The environment consists of the set $D^1 = [\bar{f}_1(a), \bar{f}_2(a), \bar{f}_3(b), \bar{f}_4(b)]$, with $\bar{f}_1(a)$ and $\bar{f}_2(a)$ belonging to class "a" and $\bar{f}_3(b)$ and $\bar{f}_4(b)$ belonging to class "b":

$$\bar{f}_1(a) = [1,0]^T$$

$$\bar{f}_2(a) = [0,1]^T$$

$$\bar{f}_3(b) = [0,0]^T$$

$$\bar{f}_4(b) = [1,1]^T$$

Figure 3:
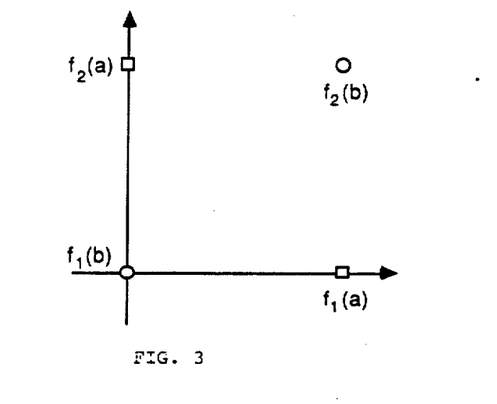
FIG. 3 is a diagram showing the pattern environment $D^1$ for the XOR problem. Two classes of patterns reside at the corners of the unit square in the activity (or response) space of layer 1.

These four patterns from memory sites in the input space (layer 1) of $R^2$, which reside at the corners of the unit square, are illustrated in FIG. 3.

Figure 4A:
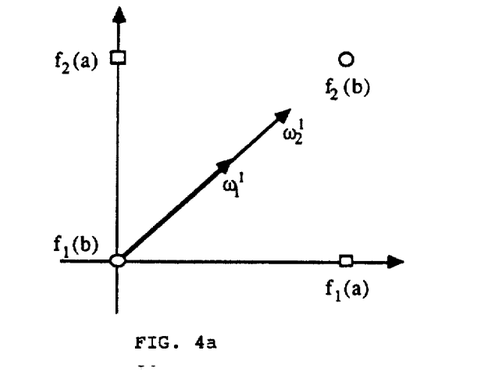
FIG. 4a is a diagram showing the initial mapping $\omega^1(D^1)$, plotted in the response space of layer 1, which creates the pattern set $D^2$.

The locations of these memories in the activity space of the layer-2 cells will depend on the initial values of the matrix $\underline{\omega}^1$. Evolution of $\underline{\omega}^1$ according to equations (13) or (14) will move the memory sites in the activity space of layer-2 until the potential energy of the configuration of memories is minimized. FIG. 4a illustrates the final configuration of activities in layer 2 for the pattern set $D^1$.

Also shown is the location of the two synaptic states $\underline{\omega}_1^1$ and $\underline{\omega}_2^1$ in the input space. Note that with the constraint of a two cell architecture at layer 2, it was not possible for all memories of the same class to settle to a single location in the activity space. Rather, $\Psi$ was minimized through the collapse of two memory sites onto one location and the separation of the other class memory sites from this location.

Figure 4B:
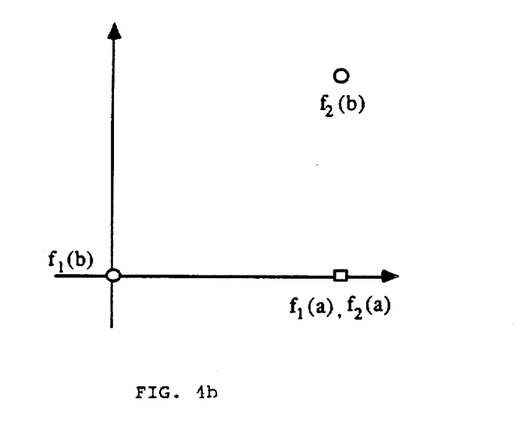
FIG. 4b is a diagram showing the pattern set $D^2$ which consists of only three distinct clusters of patterns in the response space of layer 2.

The activity patterns corresponding to the locations in activity space of layer 2, of the three distinct memories, now form the pattern set $D^2$ for possible third layer cells (FIG. 4b).

Figure 5:
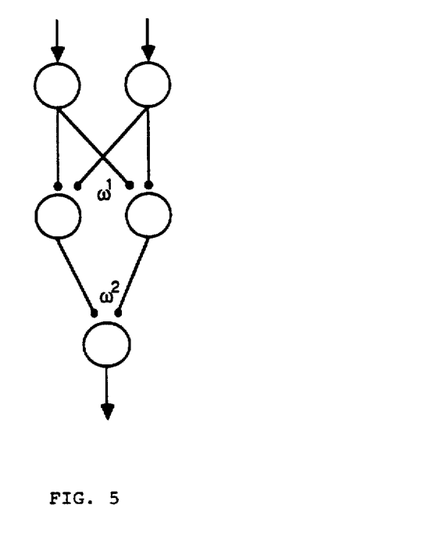
FIG. 5 is a representational diagram of a three-layer neural network for the complete mapping $D^3 = \omega^2(D^2) = \omega^2(\omega^1(D^1))$.
Figure 6A:
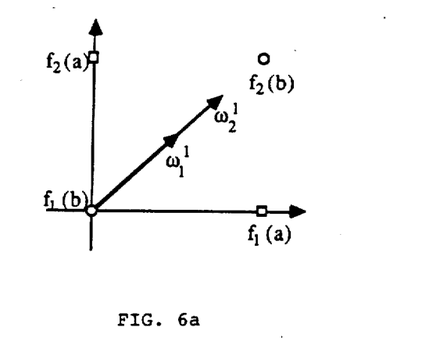
FIGS. 6a, 6b and 6c are diagrams showing, respectively, the layer 1, layer 2 and layer 3 response spaces in the neural network of FIG. 5.
Figure 6B:
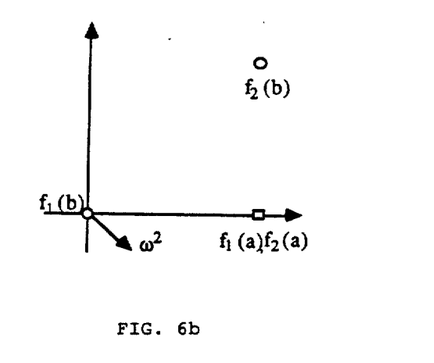
Figure 6C:
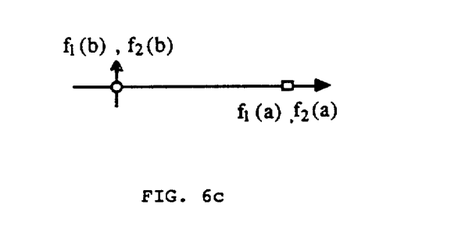

FIGS. 4a and 4b show that the memory configuration resulting from the transformation $\underline{\omega}^1(D^1)$ is now linearly separable. Memory sites of class "a" may be separated from memory sites of class "b" with a simple linear binary threshold unit. The addition of a single cell 24 as a third layer to the configuration represented in FIG. 2, as illustrated in FIG. 5 (and as represented diagrammatically in FIG. 6) with matrix $\underline{\omega}^2$ produces the transformation $D^3 = \underline{\omega}^2(D^2) = ['a', 'b'] = [1,0]$.

Examination of the resulting 3-layer network shows that the two transformations $\underline{\omega}^1$ and $\underline{\omega}^2$ form a single internal representation $$\underline{\omega}(D^1) = \underline{\omega}^2(D^2) = \underline{\omega}^2(\underline{\omega}^1(D^1)) \tag{19}$$

which is identical with that produced by the generalized delta rule. However, here the final transformation was constructed incrementally from $\underline{\omega}^1$ to $\underline{\omega}^2$. This is a significant advantage over the method of Back Propagation since training time will be a simple linear function of the number of layers in the network.

If the average time for convergence at a layer is $t_c$, then the time of convergence of a network with L layers is just $Lt_c$. That is, the time for convergence of a multi-layer network depends linearly on the number of layers in the network.

Discussion of Results:

A learning algorithm for the N-dimensional Coulomb network has been described which is applicable to single and multi-layer networks and develops distributed representations. The method relies on defining attractive and repulsive potentials between the various memories and an electrostatic potential energy of the collection of memory sites. Minimization of this energy through the adjustment of network synaptic states results in a training time of multi-layer networks which is a linear function of the number of layers. Thus, unlike the generalized delta rule, this method appears to scale well with problem size.

This method according to the invention may be applied to the supervised training of networks. With this method the underlying statistics of the pattern environment are explicitly related to the sizes of the basins of attraction. Unsupervised training is a trivial extension in which all patterns are treated as charges of same sign, thus producing mutually repulsive memory sites. Clustering is the natural result of the relative charge magnitudes defined by the statistics of the pattern environment.

Figure 7:
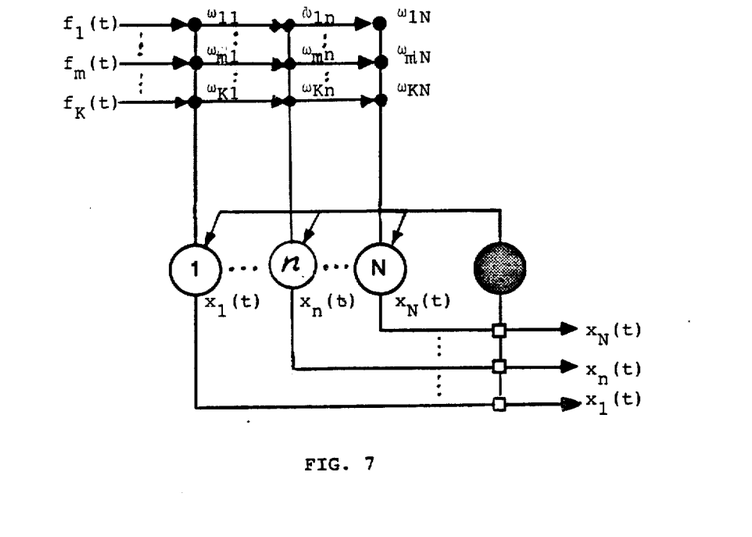
FIG. 7 is a representational diagram of a single layer, N-dimensional Coulomb neural network, illustrating a typical implementation of the learning algorithm according to the present invention.

Implementation:

The learning algorithm according to the present invention, given by equation (14) may be implemented in an N-dimensional Coulomb neural network in a straightforward manner. Reference is now made to FIG. 7 which depicts a simple, single-layer recurrent network.

The network of FIG. 7 comprises several different types of components which are illustrated with different kinds of symbols. The operation of the network will first be summarized, and will then be described in detail below.

Patterns enter the network via the lines 26 at the top left of FIG. 7. These activity patterns $f_1(t), \ldots f_m(t), \ldots f_K(t)$ (real numbers in the range from 0 to 1) enter the network and form modifiable connections $\omega_{nm}$ at the small, black, disk intersections 28 at the top of the figure. The large circles 30 numbered $1 \ldots n \ldots N$ are the cells of the network which sum activity on their lines of input (stemming from the cell "bodies", upward, in the figure). These cells produce activity levels $x_1(t), \ldots x_n(t), \ldots x_N(t)$, respectively (also real numbers in the range from 0 to 1). These activity levels form the input to the "effective" cell 32, shown as a large shaded circle, and exit the circuit along the lines at the bottom right of the figure. The effective cell computes the state space normalized distance $|\bar{x}(t)-\bar{x}(t+1)|$, and broadcasts it to all cells in this layer.

Considering now the various functions of the circuit in detail, we focus initially on the small, black, disk-like connections which represent the connection strength $\omega_{nm}$ which are modified in accordance with the learning algorithm of the present invention. Signals f(t) from outside of the circuit arrive via the lines entering at the left. These signals are weighted by the connection strengths $\omega_{nm}$ between the line m and the cell n. These weighted signals are then transmitted to the cell bodies where they are summed and transformed into cell activities $$\bar{x}(t) = \sum_{n=1}^{N} \hat{e}_n F_n \left( \sum_{m=1}^{K} \omega_{nm} f_m(t) \right) = \sum_{n=1}^{N} \hat{e}_n F_n(\bar{f}(t)), \quad (20)$$

where $\bar{x}(t)$ is a vector comprised of the real number activities $x_1(t), \ldots x_n(t), \ldots x_N(t)$, and $\hat{e}_n$ is the unit vector.

In addition, each of these connections having connection strengths $\omega_{nm}$ must hold the previously seen signal $f_m(t)$ for use in the computation of equation (14) set forth above.

The small light squares 34 in the lower right area of FIG. 7 are connections which receive the signals $x_1(t) \ldots x_n(t) \ldots x_N(t)$. These signals are stored at these connections and compared to the next successive signals at time (t+1). The square connection, for example the nth connection, then computes the difference $(\bar{x}_n(t)-\bar{x}_n(t+1))^2$.

The effective cell accumulates the $N^2$ difference terms and computes the state space distance $|\bar{x}(t)-\bar{x}(t+1)|$, which is the normalized N-dimensional vector difference, and thereafter a function of the state space difference which is the inverse power: $|\bar{x}_n(t)-\bar{x}_n(t+1)|^{-(L+2)}$, where L is an integer greater than or equal to N−2. Specifically:

$$((x_1(t) - x_1(t+1))^2 + \ldots$$
$$\cdot$$
$$\cdot$$
$$\cdot$$
$$+ (x_N(t) - x_N(t+1))^2)^{-(L+2)}$$

The effective cell transmits the function of the state space distance to all N cells in this layer of the network. These cells each compute the update term to the modifiable connections (equation (14)), and feed this term back to the connections for adjustment. The update term is a product of the quantities $|\bar{x}(t)-\bar{x}(t+1)|^{-(L+2)}$ and $\Delta_{nm}(\bar{f}(t), \bar{f}(t+1))$, wherein this latter quantity is given by:

$$\Delta_{nm}(\bar{f}(t), \bar{f}(t+1)) = (F_n(\bar{f}(t)) - F_n(\bar{f}(t+1))) \times (F_n(\bar{f}(t)) (1 -$$
$$F_n(\bar{f}(t))) f_m(t) - F_n(\bar{f}(t+1)) (1 - F_n(\bar{f}(t+1))) f_m(t+1)).$$

where $F_n(\bar{f}(t))$ is defined as $\bar{x}_n(t)$.

To compute this quantity, each cell must retain a copy of its last activity level, $F_n(t)$, for comparison to the next activity level, $F_n(t+1)$, so as to compute $F_n(\bar{f}(t))-F_n\bar{f}(t+1)$, and the factors: $|\bar{x}(t)-\bar{x}(t+1)|^{-(L+2)}$ In addition, each connection $\omega_{nm}$ must retain a copy of the previously seen signal $f_m(t)$. These quantities must be available at the connections $\omega_{nm}$ so that they may be combined to form the factor: $\Delta_{nm}(f(t), f(t+1))$, that is, the cell and its connections must have available the following quantities:

$$|\bar{x}(t) - \bar{x}(t+1)|^{-(L+2)}$$

$$F_n(t), F_n(t+1)$$

$$f_m(t), f_m(t+1)$$

It will be understood that the circuit of FIG. 7 may be implemented either by analog or digital circuitry. It is perhaps most convenient if each of the elements (connections $\omega_{nm}$, network cells, output connections to the effective cell and the effective cell itself) are each implemented by dedicated digital hardware. The N-dimensional network can also be implemented and simulated by software in a parallel processing computer.

Figure 8:
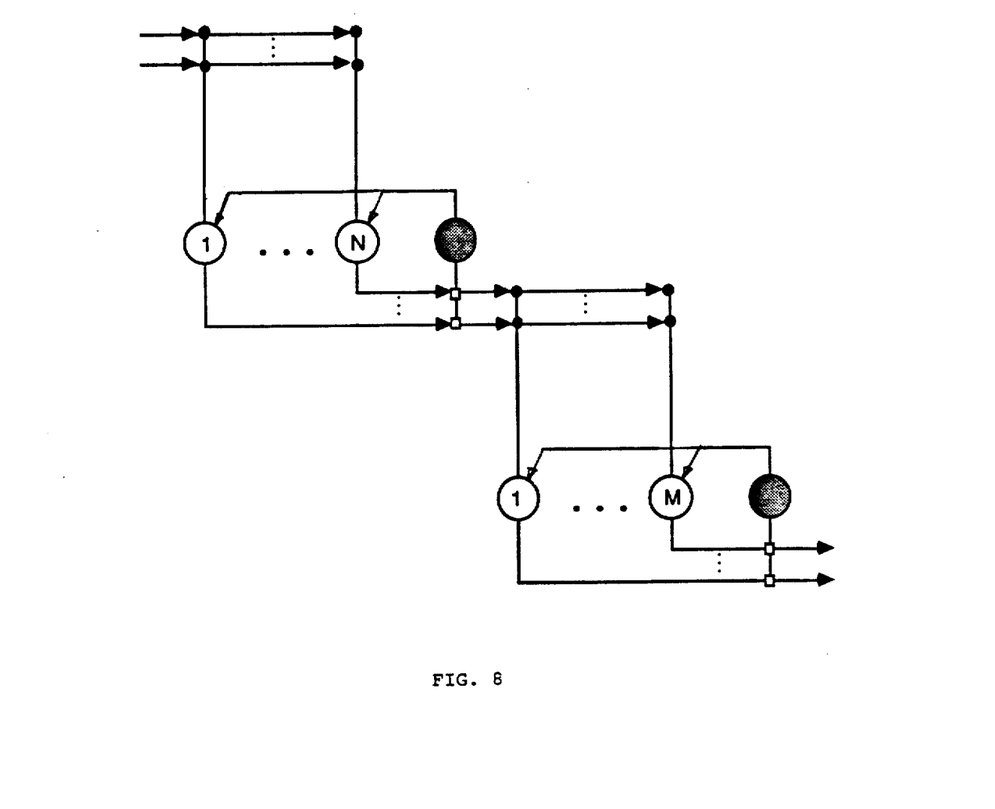
FIG. 8 is a diagram of a multi-layer neural network of the type shown in FIG. 7, illustrating the connectivity between layers.

Whereas the preceding discussion focused on the development of a single layer N-dimensional network, once a layer has converged to a representation, additional layers may be added as illustrated in FIG. 8. In fact, such multiple layers may develop concurrently and independently of each other in a multi-layer, N-dimensional Coulomb neural network.

There has thus been shown and described a novel learning algorithm for an N-dimensional Coulomb network which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. An N-dimensional Coulomb neural network comprising, in combination:
    (a) a plurality K of input terminals, each terminal (m) for receiving one of K input signals $f_m(t)$;
    (b) a plurality N of neural cells, each neural cell (n) having K inputs and one output, and for producing a first output signal $x_n(t)$ at its output representing a sum of K signal representations applied to its inputs;
    (c) a plurality N×K of input connection elements, each input connection element (mn) coupling one of said input terminals (m) with one of said neural cells (n) and providing a transfer of information from a respective input terminal (m) to a respective neural cell (n) in dependence upon a signal $f_m(t)$ appearing at an input terminal thereof and upon a connection strength $\omega_{nm}$ of said connection element;
    (d) a plurality N of output connection elements, each output connection element (n) being coupled to said output of a respective one (n) of said neural cells and including:
        (1) means for storing said first output signal $x_n(t)$ of the neural cell (n) to which it is coupled; and
        (2) means for subtracting a next received first output signal $x_n(t+1)$ from a previously stored first output signal $x_n(t)$ to form a difference, and for producing a second output signal $(x_n(t)-x_n(t+1))^2$ representing a square of said difference;
    (e) an effective cell connected to said output connection elements for receiving said second output signals and having means for computing a function of a state space distance, where L is an integer greater or equal to $N-2$,
    and for producing a third output signal representative thereof,
    wherein each of said neural cells adjusts a connection strength ($\omega_{nm}$) in accordance with the formula:

$$\delta\omega_{nm} = (+/-)|\vec{x}(t)-\vec{x}(t+1)|^{-(L+2)}\Delta_{nm}(\vec{f}(t),\vec{f}(t+1))$$

where $\Delta_{nm}(\vec{f}(t), \vec{f}(t+1))$ is given by:

$$\Delta_{nm}(\vec{f}(t), \vec{f}(t+1)) = (F_n(\vec{f}(t)) - F_n(\vec{f}(t+1))) \times (F_n(\vec{f}(t))(1 - F_n(\vec{f}(t)))f_m(t) - F_n(\vec{f}(t+1))(1 - F_n(\vec{f}(t+1)))f_m(t+1)).$$

2. The neural network of claim 1, wherein for supervised learning the negative sign of $\delta\omega_{nm}$ is taken for subsequent patterns of the same class and the positive sign of $\delta\omega_{nm}$ is taken for subsequent patterns of a different class.

3. The neural network of claim 2, wherein for unsupervised learning only the positive sign is taken for $\delta\omega_{nm}$ for all subsequent patterns.

* * * * *